US006985963B1

(12) United States Patent
Johnson et al.

(10) Patent No.: US 6,985,963 B1
(45) Date of Patent: Jan. 10, 2006

(54) SHARING IP NETWORK RESOURCES

(75) Inventors: Jeremy T. Johnson, Foster City, CA (US); Milo S. Medin, Sunnyvale, CA (US)

(73) Assignee: At Home Corporation, Redwood City, CA (US)

( * ) Notice: Subject to any disclaimer, the term of this patent is extended or adjusted under 35 U.S.C. 154(b) by 1003 days.

(21) Appl. No.: 09/645,011

(22) Filed: Aug. 23, 2000

(51) Int. Cl.
*G06F 13/00* (2006.01)

(52) U.S. Cl. .................. 709/242; 709/238; 370/395.31

(58) Field of Classification Search ................ 709/238, 709/242; 370/395.3, 395.31, 351, 381
See application file for complete search history.

(56) References Cited

U.S. PATENT DOCUMENTS

| 6,192,051 | B1 * | 2/2001 | Lipman et al. | 370/389 |
| 6,205,488 | B1 * | 3/2001 | Casey et al. | 709/238 |
| 6,330,614 | B1 * | 12/2001 | Aggarwal et al. | 709/236 |
| 6,477,166 | B1 * | 11/2002 | Sanzi et al. | 370/395.1 |
| 6,538,991 | B1 * | 3/2003 | Kodialam et al. | 370/229 |
| 6,556,544 | B1 * | 4/2003 | Lee | 370/256 |
| 6,584,071 | B1 * | 6/2003 | Kodialam et al. | 370/238 |
| 6,611,532 | B1 * | 8/2003 | Madour et al. | 370/466 |
| 6,680,943 | B1 * | 1/2004 | Gibson et al. | 370/392 |
| 6,728,777 | B1 * | 4/2004 | Lee et al. | 709/238 |
| 6,728,782 | B1 * | 4/2004 | D'Souza et al. | 709/242 |
| 2002/0071389 | A1 * | 6/2002 | Seo | 370/232 |
| 2003/0103510 | A1 * | 6/2003 | Svanberg et al. | 370/395.2 |

OTHER PUBLICATIONS

Grenville Armitage; MPLS: The Magic Behind the Myths; IEEE Communications Magazine; pp. 124-131; Jan. 2000.*
P. Aukia et al.; Rates: A Server for MPLS Traffic Engineering; IEEE Network Magazine; pp. 34-41; Mar. 2000.*
Murali Kodialam et al.; Minimum Interference Routing with Applications to MPLS Traffic Engineering; INFOCOM 2000; pp. 884-893; Mar. 2000.*
Richard Mortier et al.; Switchlets and Resource-Assured MPLS Networks; pp. 1-17; Cambridge University Computer Laboratory; May 2000.*
Manuel Gunter; Virtual Private Networks over the Internet; citeseer.com document; pp. 1-7; Aug. 1998.*

(Continued)

*Primary Examiner*—Kenneth R. Coulter
(74) *Attorney, Agent, or Firm*—Fenwick & West

(57) ABSTRACT

A system and method for sharing access to an internet protocol (IP) network among multiple internet service providers (ISPs) uses multiprotocol label switching (MPLS). End-users are coupled to a broadband customer access network. Each end-user is also associated with at least one of the ISPs. An aggregation router interfaces the customer access network with a network backbone. The network backbone includes a border router for interfacing between the network backbone and the network of an ISP. When the border router is activated, it creates a forwarding equivalency class (FEC) corresponding to the ISP. The border router stores a label for the FEC and the interface for reaching the ISP in an FEC table. The border router advertises the label binding for the FEC to all upstream nodes. An intermediate node receiving the label binding creates its own FEC table, associates a new label with the FEC, and advertises the new label binding to its upstream nodes. The aggregation router receives and builds a FEC table containing the label bindings for all ISPs reachable over the network backbone. When the aggregation router receives a data packet from an end-user, the aggregation router determines the ISP associated with the end-user, labels the data packet with the label corresponding to the FEC for that ISP, and routes the packet on the network backbone. The packet eventually reaches the border router, which pops off the label and passes the packet to the ISP.

11 Claims, 5 Drawing Sheets

OTHER PUBLICATIONS

Semeria, "Traffic Engineering for the New Public Network," White Paper, Juniper Network, Inc., 23 pages, Sep. 2000.

Callon et al., "A Framework for Multiprotocol Label Switching," [online]. Network Working Group Internet Draft, Sep. 1999 [retrieved on Nov. 21, 2000]. Retrieved from the Internet: <URL: http://www.ietf.org/internet-drafts/draft-ieft-mpls-framework-05.txt>, 64 pages.

Anderson et al., "LDP Specification," [online]. Network Working Group Internet Draft, Oct. 1999 [retrieved on Nov. 21, 2000]. Retrieved from the Internet: <URL: http://www.ieft.org/internet-drafts/draft-ieft-mpls-ldp-06.txt>, 124 pages.

Rosen et al., "Multiprotocol Label Switching Architecture," [online]. Network Working Group Internet Draft, Aug. 1999 [retrieved on Nov. 21, 2000]. Retrieved from the Internet: <URL: http://www.ieft.org/internet-drafts/draft-ieft-mpls-arch-06.txt>, 62 pages.

\* cited by examiner

400A

| ASN | NEXT HOP | UPSTREAM LABEL |
|---|---|---|
| X | 10.4.4.4 | LABEL_1 |

| ASN | NEXT HOP | DOWNSTREAM LABEL | UPSTREAM LABEL |
|---|---|---|---|
| X | 10.1.0.1 | LABEL_1 | LABEL_3 |
| Y | 10.0.0.1 | LABEL_2 | LABEL_4 |

| ASN | NEXT HOP | DOWNSTREAM LABEL |
|---|---|---|
| X | 10.1.1.1 | LABEL_3 |
| Y | 10.1.1.1 | LABEL_4 |

FIG. 4C

SHARING IP NETWORK RESOURCES

BACKGROUND

1. Field of the Invention

This invention pertains in general to computer networks and in particular to a broadband network for coupling end-users to Internet service providers.

2. Background Art

In recent years, there has been substantial growth in broadband Internet access. In the traditional sense, "broadband" refers to a transmission medium capable of supporting a wide range of frequencies. In more common parlance, however, "broadband" refers to a transmission medium capable of supporting a high data transfer rate. An example of a broadband network is a cable modem network.

In a broadband network, the network infrastructure closest to the end-user is referred to as the "customer access network." The customer access network for a cable modem network is the cable that runs from a cable modem termination server (CMTS) in a cable television headend to the end-user and the radio frequency (RF) plant for driving the signals carried on the cable. Usually, multiple end-users share the bandwidth available on a single cable.

A customer access network is typically aggregated with other customer access networks and linked to a high-speed network backbone. The backbone, in turn, is linked to the Internet. Typically, the customer access network and backbone are owned and/or operated by a single entity, or by two entities operating under a joint agreement. For example, a cable network is typically owned by a single cable company called a Multiple Systems Operator (MSO) and the backbone is managed by a partner of the MSO.

While there are relatively few entities that own the broadband network infrastructure, there are many Internet service providers (ISPs) that desire to provide Internet access to the end-users. However, the entities that own the broadband network infrastructure have been reluctant to share network access with other ISPs due, in part, to the difficulty in sharing the bandwidth on the cable network. Bandwidth on the customer access network, while broadband, is not unlimited, and heavy use by the end-users of one ISP can impact the bandwidth available to the users of other ISPs. In one attempted solution to this problem, each ISP is allocated a 1.5 MHz upstream slice and a 6 MHz downstream slice of the available frequency spectrum. These slices are referred to as "channels." In this solution, traffic for one ISP would not interfere with traffic for another ISP. However, the upstream frequency spectrum on a cable network available to cable modems is limited to frequencies below 80 MHz. Since this is a noisy part of the spectrum, there are usually only about six to 18 upstream channels available on the cable. It is inefficient and impractical to allocate channels to particular ISPs since ISPs with many end-users would require more bandwidth than is available in a channel while the channels of ISPs having few end-users would be underutilized.

Accordingly, the entities that own and/or operate the network infrastructure often require the end-user to use a single ISP. That ISP, in turn, is usually associated with the entity or entities that own and/or operate the network. Thus, an end-user with a cable modem typically uses an ISP affiliated with the MSO. If the end-user desires to use a different ISP, the end-user often must use a narrowband connection, such as an analog modem using a plain old telephone service (POTS) line, to connect to the ISP.

Since multiple ISPs desire access to the broadband network infrastructure, there is a need in the art for a way for the ISPs to efficiently share the available bandwidth on the customer access network and broadband network. A solution to this need should allow an end-user on a broadband customer access network to select from among multiple ISPs and should allow accounting for the bandwidth utilized by the customers of each ISP.

DISCLOSURE OF THE INVENTION

The above needs are met by method and system using multiprotocol label switching (MPLS) to source route Internet protocol (IP) packets from an end-user to the ISP associated with that end-user. A plurality of end-users are coupled to a customer access network, such as a cable modem network or a digital subscriber line (DSL) network. Each end-user is associated with a particular Internet service provider (ISP). A reference to the ISP, preferably the autonomous system number (ASN) of the ISP, is soft- or hard-coded at the end-user.

The end-users are connected to a broadband customer access network, such as a cable television or telephone network. An aggregation router, such as a cable modem termination server or a DSL access multiplexer, aggregates the data packets received from the end-users. Each end-user informs the aggregation router of the ASN of the ISP associated with that end-user. The aggregation router transmits the aggregated data packets over a network backbone to a border router. The border router couples one or more ISPs to the network backbone.

The border router is configured to sense the ASNs and IP addresses of the ISPs coupled to it upon activation. The border router creates a forwarding equivalency class (FEC) for each coupled ISP. The border router binds a label to each FEC and stores the label, the ASN of the ISP, and the IP address of the ISP in an FEC table. The border router advertises the label binding (the label and the FEC) to all of its upstream nodes.

When an upstream node, such as an intermediate node between the aggregation router and the border router, receives the advertisement, the node adds the advertised label binding to its local FEC table along with the IP address of the next hop for the FEC. The node also creates a new label for the FEC called the "upstream label" and stores it in the FEC table. The node creates a new label binding for the FEC using the upstream label and advertises this label binding to its upstream nodes. This binding and advertising process repeats until the aggregation router receives the label bindings for all FECs reachable from the aggregation router.

When the aggregation router receives an IP data packet from an end-user, the aggregation router determines the ASN of the ISP associated with that end-user. The ASN number is used as an index into the FEC table held at the aggregation router and the corresponding label is pushed onto the packet. Then, the aggregation router routes the packet to the next hop specified for that FEC by the FEC table.

When an intermediate node receives the forwarded packet, the node pops off the label for the packet and uses the label as an index into its local FEC table. The intermediate node retrieves the corresponding downstream node from the table and pushes it onto the packet. Then, the intermediate node forwards the packet to the next hop specified in the FEC table.

When the border router receives a packet, it pops off the label and forwards the unlabeled packet to the appropriate ISP. If desired, traffic accounting can be performed by counting the packets forwarded to the ISP by the border router. Accordingly, the present invention allows multiple ISPs to efficiently share the customer access and backbone networks.

BRIEF DESCRIPTION OF THE DRAWINGS

FIGS. 4A–4C illustrate exemplary forwarding equivalency class tables; and

DETAILED DESCRIPTION OF THE PREFERRED EMBODIMENTS

Figure 1:
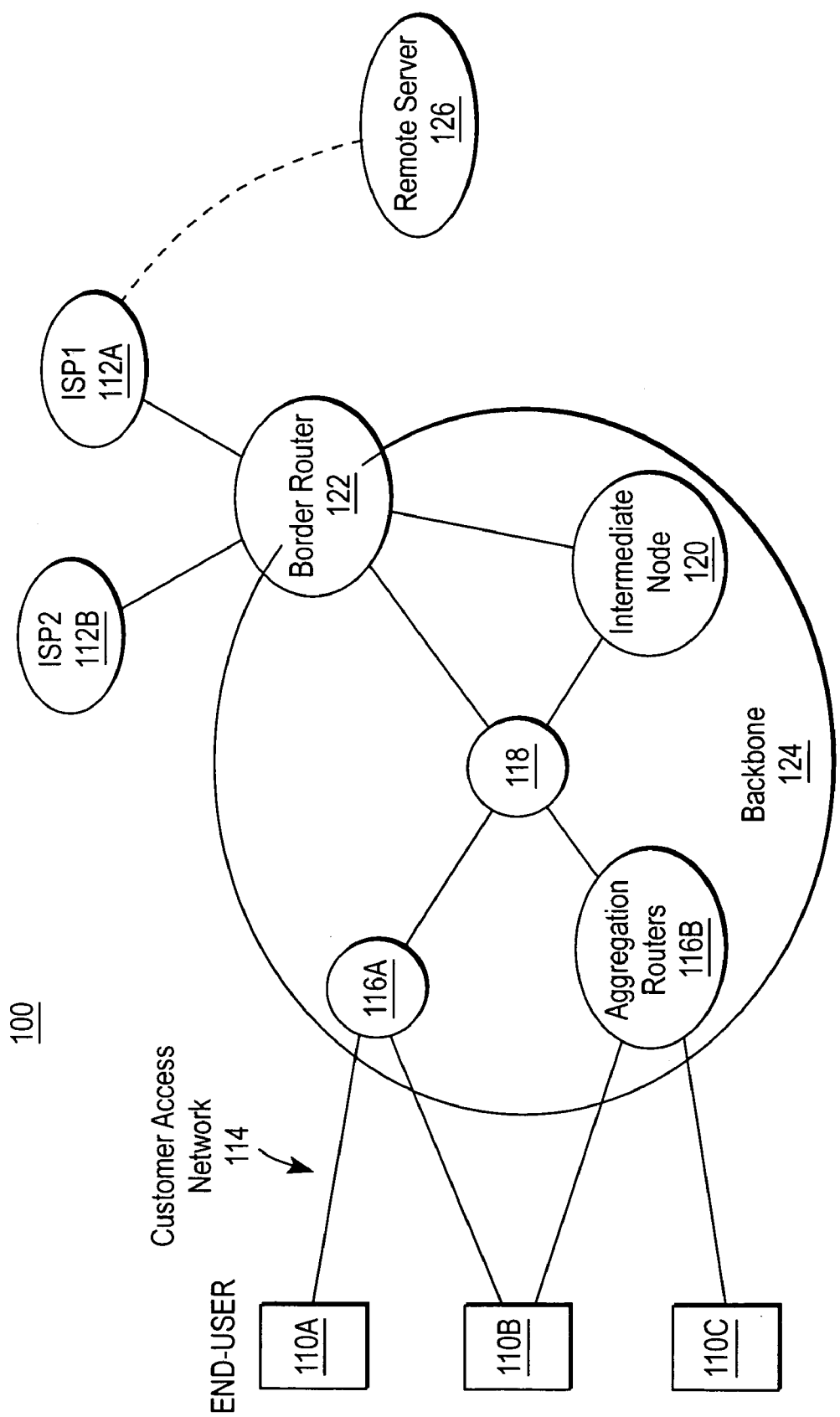
FIG. 1 is a block diagram illustrating a high-level view of network infrastructure according to an embodiment of the present invention.

FIG. 1 is a block diagram illustrating a high-level view of a network infrastructure 100 according to an embodiment of the present invention. FIG. 1 illustrates three end-users users 110A, 110B, 110C connected to the network. As used herein, the term "end-user" can refer to a person using a computer system to connect to the network, the computer system itself, or a network access device, such as a modem, connecting the computer system to the network. In a typical use, a person will direct the computer system to send data out to a network and the computer will utilize the network access device to send the data. Data from an end-user 110 typically consists of Internet protocol (IP) data packets.

In one embodiment of the present invention, the network access device is either a cable modem or a digital subscriber line (DSL) modem. However, the present invention supports any form of network access device providing the functionality described herein. In a preferred embodiment of the present invention, the end-user 110 is associated with one Internet service provider (ISP) selected from among multiple ISPs, of which ISPs 112A and 112B are exemplary. In one embodiment of the present invention, a reference to the ISP 112 is soft- or hard-coded into the network access device. For example, the ISP reference can be encoded into the network access device during manufacture, selected by a person using software, jumpers, or switches, or encoded via an automated process when the access device is activated on the network. In an alternative embodiment, an end-user 110 can be associated with more than one ISP 112, although it is anticipated that the end-user will use only one ISP for an Internet session.

An end-user preferably 110 is connected via a broadband customer access network 114 to one or more aggregation routers 116A, 116B. Typically, each end-user 110 is coupled to one aggregation router 116, although embodiments where the end-user is coupled to multiple aggregation routers are also possible. In the embodiment where the end-user 110 is a cable modem, the customer access network 114 is prefer- ably a cable television distribution network shared by multiple geographically proximate cable modem users. In such an embodiment, the aggregation router 116 is preferably a cable modem termination server (CMTS) located within the headend of the cable network. The CMTS aggregates the signals from the multiple end-users served by the headend. In the embodiment where the end-user 110 is a DSL modem, the customer access network 114 is preferably a telephone network. In such an embodiment, the aggregation router 116 is preferably a DSL access multiplexer (DSLAM) or a subscriber management system (SMS). The aggregation router 116 aggregates the signals from DSL users served by the central office in which the DSLAM or SMS is located.

Depending upon the embodiment of the present invention, either the end-user 110 or the aggregation router 116 is a "headend device." The headend device is preferably connected to the next hop (i.e., the aggregation router 116 or an intermediate node 118, depending upon which entity is the headend device) by a direct physical or logical connection. However, the headend device can be connected by any other connection type as long as the connection type does not include an active routing device. For example, the head-end device may be a bridge that merely translates and forwards packets.

If the aggregation router 116 is the headend device, the end-user 110 preferably informs the headend device of the ISP 112 associated with the end-user. This procedure preferably happens automatically. For example, if the end-user 110 is a cable modem and the headend device is an aggregation router 116 in a CMTS, the cable modem preferably uses the Data Over Cable Service Interface Specification (DOCSIS) to provide the aggregation router with the reference to the ISP 112 associated with the end-user 110. In this example, the reference to the ISP is preferably set via a new type, length, value (TLV) configuration parameter.

If, in contrast, the end-user 110 is a DSL modem and the headend device is a DSLAM, the headend device can derive the identity of the end-user 110 from the physical port, copper pair, asynchronous transfer mode (ATM) virtual circuit, or other incoming data interface to which the end-user is coupled. With this knowledge, the headend device can easily look up the ISP associated with the end-user 100. Thus, the headend device knows the ISP 112 associated with each end-user 110.

One or more intermediate nodes are connected to the aggregation routers 116A, 116B. In FIG. 1, the aggregation routers 116A, 116B are connected to a first intermediate node 118 which, in turn, is coupled to a second intermediate node 120. The first and second intermediate nodes 118, 120 are connected to a border router 122. As with the headend device, an intermediate node 118, 120 is preferably connected to the next hop (i.e., another intermediate node or a border router) with a direct physical or logical connection.

Although only one border router 122 is shown in FIG. 1, embodiments of the present invention can have any number of border routers connected to the headend or any intermediate node. The border router 122 is connected to one or more other networks (i.e., ISPs). In FIG. 1, the illustrated border router 122 is connected to the networks of first 112A and second 112B ISPs. The border router 122 is preferably connected to the ISPs 112 via either a direct physical connection, such as a telephone company circuit, a fast Ethernet connection, an asynchronous transfer mode (ATM) connection, or a fiber distributed data interface (FDDI) connection, or a logical connection, such as an IP tunneling connection. Furthermore, the ISP 112 should not be more than one hop away from the border router 122.

The aggregation routers 116, intermediate nodes 122, and border router 122 form a network backbone 124. The present invention allows data from the end-users 110 to reach associated ISPs 112 through the customer access network 114 and backbone 124. The backbone 124 preferably provides extremely high bandwidth in order to support many end-users 110 and ISPs. The present invention allows the bandwidth on the customer access network 114 and network backbone 124 to be efficiently shared among the end-users 110 of multiple ISPs 112.

The term "ISP" is used herein to refer to any network or server receiving data packets from an end-user via the customer access network 114 and backbone 124. Although the term "ISP" is used above to describe a network that provides Internet access to an end-user 110, an ISP can provide any network-based service. An ISP can, for example, merely be an intermediate network that transports end-user 110 data to another network on the Internet or elsewhere. What the ISP does with the data packets is not material to the present invention.

Embodiments of the present invention can have many different ISPs connected to the backbone 124 via border routers. Exemplary ISPs include @Home, Sprint, MCI, America Online, Microsoft Network, Mindspring, and Earthlink. It should be recognized, however, that there are thousands of different ISPs. Multiple ISPs can be connected to a single border router 122 or each ISP can have a dedicated border router. Likewise, a single ISP 112 can be coupled to multiple border routers on the network backbone 124 in order to provide redundancy. Preferable, the ISP is identified by an autonomous system number (ASN) assigned to the ISP by an organization devoted to that purpose. In the United States, ASNs are assigned by the American Registry for Internet Numbers (ARIN). The ASN is a value that uniquely identifies the network of the ISP 112. In one embodiment of the present invention, the "reference to the ISP" stored by the end-user 110 is the ASN of the ISP.

Typically, the ISP 112 is connected via the Internet to a remote server 126. The remote server 126 can provide any Internet-based service. For example, the remote server 126 might be a web server managed by EXCITE@HOME, EBAY, or YAHOO.

A preferred embodiment of the present invention uses multiprotocol label switching (MPLS) to route IP data packets from the end-user 110 to the appropriate ISP 112. MPLS routes IP data packets from one router to the next, such as from intermediate node 118 to intermediate node 120, using an independent forwarding decision for each packet. Each router independently chooses a next hop for a packet. Choosing the next hop can be thought of as the composition of two functions. The first function partitions the entire set of possible packets into a set of forwarding equivalence classes ("FECs"). The second function maps each FEC to a next hop. All packets which belong to a particular FEC and which travel from a particular node will follow one of a set of paths associated with the FEC.

In MPLS, the assignment of a particular packet to a particular FEC is performed only once, as the packet enters the network. The FEC to which the packet is assigned is encoded with a label. The label is preferably a short, four-byte value called a "shim header." Packets are labeled at each router before the packets are forwarded by adding the shim header to an otherwise unaltered IP packet. At subsequent hops, the label is used as an index into a table which specifies the next hop, the outgoing network interface, and a new label. The old label is replaced with the new label, and the packet is forwarded through the specified network interface to the next hop. The path followed by the packet through the network is called the "label switched path" (LSP).

Additional details on MPLS can be found in Rosen, Viswanathan, Callon, "Multiprotocol Label Switching Architecture," August 1999, available at http://www.ietf.org/ietf/draft-ietf-mpls-arch-06.txt, and Callon, Doolan, Feldman, Fredette, Swallow, Viswanathan, "A Framework for Multiprotocol Label Switching," September 1999, available at http://www.ietf.org/ietf/draft-ietf-mpls-framework-05.txt, and Andersson, Doolan, Feldman, Fredette, Thomas, "LDP Specification," October 1999, available at http://www.ietf.org/ietf/draft-ietf-mpls-ldp-06.txt, all of which are hereby incorporated by reference herein. In general, these references describe MPLS over layers one and two of the Open Systems Interconnection (OSI) reference model. A preferred embodiment of the present invention, in contrast, utilizes MPLS over layer three of the OSI model, the Network layer.

Figure 2:
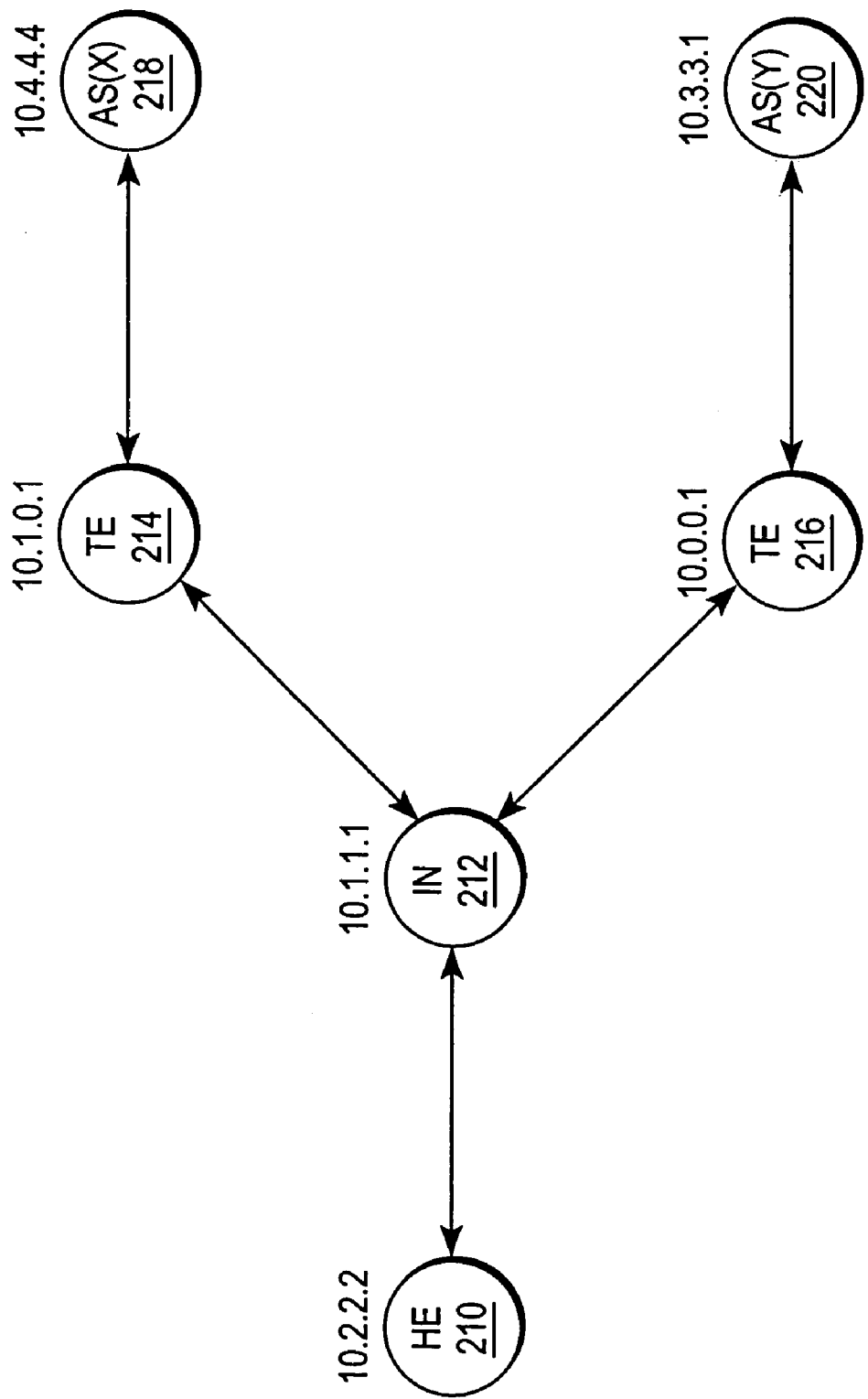
FIG. 2 is a block diagram illustrating a view of the customer access and backbone networks according to an embodiment of the present invention.

FIG. 2 is a block diagram illustrating several LSPs 200 within the customer access network 114 and backbone 124 according to an embodiment of the present invention. FIG. 2 illustrates a single headend 210. As described above, the headend 210 is typically either the end-user 110 or the aggregation router 116, depending upon the embodiment of the present invention. The headend 210 pushes the initial labels onto the data packets. An intermediate node 212 is located between the headend 210 and the tailends 214, 216. The tailends 214, 216 pop the final labels off the packets. In a preferred embodiment of the present invention, the tailends 214, 216 are border routers of the backbone 124. The two illustrated tailends 214, 216 are respectively coupled to first and second ISPs 218, 220. The ISPs are 218, 220 are autonomous from the backbone 124. The first ISP 218 has an ASN of X, designated as ASN(X), and the second ISP 220 has an ASN of Y, designated as ASN(Y). In FIG. 2, the direction from the headend 210 to the tailend 214, 216 is referred to as the "downstream" direction while the direction from the tailend 214, 216 to the headend 210 is referred to as the "upstream" direction.

Figure 3:
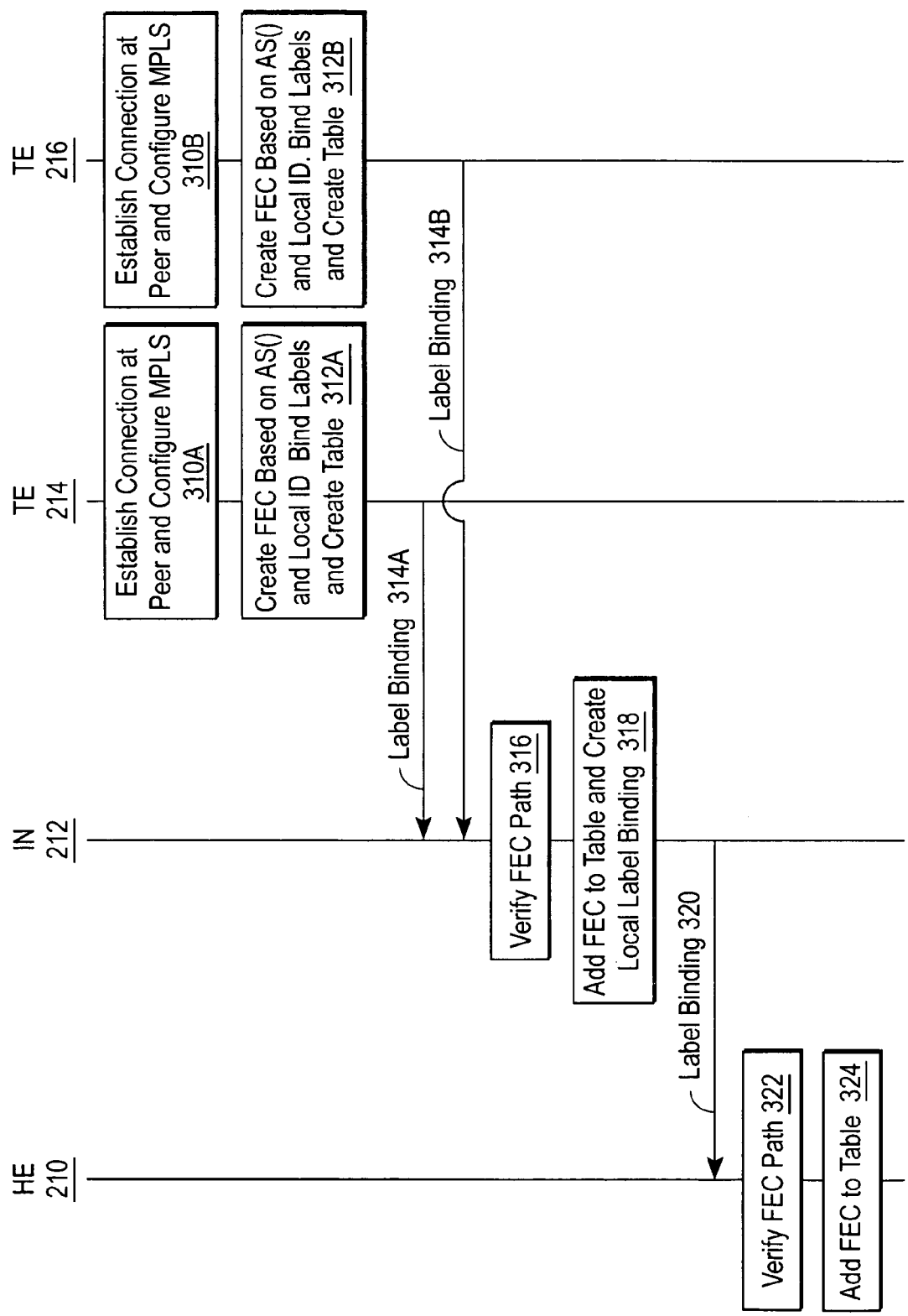
FIG. 3 is a flow diagram illustrating steps performed and communications made by the entities illustrated in FIG. 2 when establishing label switched paths (LSPs) according to an embodiment of the present invention.

FIG. 3 is a flow diagram illustrating steps performed and communications made by the entities illustrated in FIG. 2 when establishing LSPs using a label distribution protocol according to an embodiment of the present invention. Alternative embodiments of the present invention can use different label distribution protocols and/or data encapsulation methods. FIG. 3 lists the headend 210, intermediate node 212, and two tailends 214, 216 along the top of the figure. Actions performed by the entities are in boxes below the entities and communications between the entities are represented by horizontal arrows. For purposes of example, assume that the headend 210 has an internet protocol (IP) address of 10.2.2.2, the intermediate node 212 has an IP address of 10.1.1.1, the first border router 214 has an IP address of 10.1.0.1, the second border router 216 has an IP address of 10.0.0.1, the first ISP 218 has an IP address of 10.4.4.4, and the second ISP 220 has an IP address of 10.3.3.1.

When the tailends 214, 216 (i.e., the border routers) are initially activated, the tailends establish 310 connections with their respective peer ISPs and determine the actual outgoing interfaces that transmit data to the peers. Thus, tailend 214 determines that its peer is the ISP 218 having ASN(X) and IP address 10.4.4.4, and determines the specific outbound interface that it will use to transmit data to the ISP 218. Tailend 216 performs the same function with respect to ISP 220. Then, each tailend 214, 216 creates 312 a FEC for its peer. The FEC is derived from the ASN of the peer and an IP address of the tailend 214, 216 (preferably a loopback address of the tailend router). The tailend 214, 216 also binds 312 a label to the FEC. The label is a short, preferably fixed length, locally significant identifier which is used to identify a particular FEC. In one embodiment, the label is the shim header described previously. The FEC and label, taken together, are referred to as the "label binding."

The tailend 214, 216 also preferably creates 312 an FEC table, or updates an existing table, with the FECs reachable from the tailend. FIG. 4A illustrates an exemplary table 400A for tailend 214. For each FEC, the table at the tailend 214 holds the ASN, the next hop, or address of the next server for reaching the system having the given ASN, and an upstream label corresponding to the FEC. Although not shown in FIG. 4, the FEC table also preferably holds the outbound interface for each next hop. Since tailend 214 can only reach one ISP 218 in our example, the FEC table of FIG. 4A has only one entry.

The tailend 214, 216 advertises its existence to all of its peers within the backbone 124. In a preferred embodiment of the present invention, LSP advertisements are disabled on any external (i.e., downstream) facing interfaces of the tailend 214, 216. An LSP advertisement includes the label bindings for the autonomous systems reachable through the tailend 214, 216.

The LSP advertisements are passed 314 to the upstream peer routers. In the example of FIG. 2, the intermediate node 212 is the next upstream router for both tailends 214, 216. After receiving an LSP advertisement, the intermediate node 212 verifies 316 via its routing table that a better path for the FEC does not exist and that the FEC does not create a routing loop. The intermediate node 212 also arbitrates between similar FECs and label bindings. Arbitration may be required in some embodiments because an intermediate node 212 may have several different paths available for reaching a given tailend 214, 216. In a preferred embodiment of the present invention, the LSP with the shortest distance, calculated using a routing metric independent of the routing protocol, is the active LSP for the intermediate node 212 until that LSP is no longer the shortest distance or the LSP is torn down. The intermediate node 212 also creates 318 its own label bindings based on the FECs received from the downstream nodes and stores the labels for these label bindings in its local FEC table.

FIG. 4B illustrates an exemplary FEC table for the intermediate node 212. As with the table of FIG. 4A, this table lists ASNs and associated next hops. In the table of FIG. 4B, the next hop address for ASN(X) is the IP address of tailend 214 while the next hop address for ASN(Y) is the IP address of tailend 216. The table also has entries for downstream labels and upstream labels. The downstream labels are the labels for the label bindings received from the downstream nodes. The upstream labels, in contrast, are the labels for the label bindings created locally by the intermediate node 212.

The intermediate node 212 advertises 320 the label bindings it created 318, i.e. the label bindings having the upstream labels, to its upstream nodes. If there are multiple LSPs for a particular FEC, the intermediate node 212 preferably advertises only the label binding for the active LSP for the FEC to the upstream nodes.

In the example of FIG. 2, the headend 210 is the only upstream node of the intermediate node 212. As with the intermediate node 212, the headend 210 uses its routing table to verify 322 and arbitrate the LSPs for the received FECs. If there are multiple paths for a FEC, the headend places 324 the best path for the FEC in its FEC table. FIG. 4C illustrates an exemplary FEC table for the headend 210. The table for the headend 210 resembles the other tables, except that the addresses for the next hops for both ASN(X) and ASN(Y) are 10.1.1.1, the address of the intermediate node 212. Also, the table for the headend 210 does not have an "upstream label" column because there are no upstream nodes in the LSP. Once all of the label bindings are passed back to the headend 210, the headend FEC table contains all FECs reachable from the headend.

Figure 5:
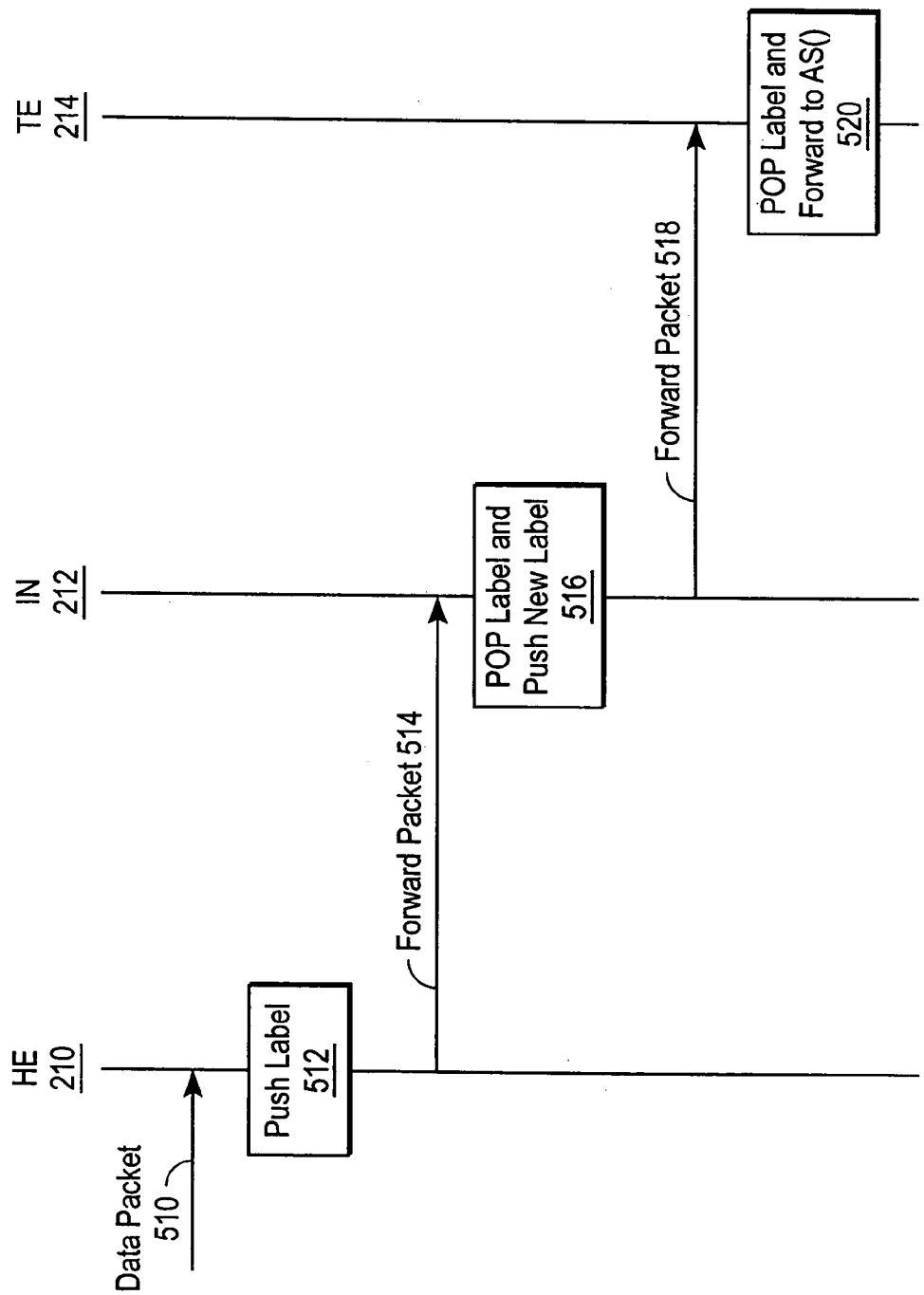
FIG. 5 is a flow diagram illustrating steps performed and communications made by the entities illustrated in FIG. 2 when forwarding data down a LSP according to an embodiment of the present invention.

FIG. 5 is a flow diagram illustrating steps performed and communications made by the entities illustrated in FIG. 2 when forwarding data down a LSP. Initially, the headend 210 receives 510 an IP data packet from an end-user 110. If the headend 210 is an end-user 110, the headend explicitly knows with which autonomous system (AS) (i.e., ISP 112) the end-user is associated. If the headend 210 is not an end-user 110, the headend 210 still knows from which end-user 110 the packet was received, the ISP associated with that end-user, and the ASN associated with that ISP.

If the headend 210 has an entry in the FEC table with the ASN for the ISP associated with the end-user 110 who sent the packet, the headend pushes 512 the corresponding downstream label onto the packet. For example, if the end-user is associated with ISP 218 having ASN(X), the headend 210 will push label "label_3" onto the packet. "Label_3" is the downstream label for the FEC specifying the ISP having ASN(X) in the example of FIGS. 2–4. The headend 210 forwards 514 the packet with the label to the corresponding "next hop" address in the FEC table 400C. In this example, the next hop is to the intermediate node 212. This technique routes the packet based on the source of the packet rather than the destination specified by the packet itself and is known as "source-based routing," or simply "source routing."

If the headend 210 has multiple entries in the FEC table 400C for reaching the ISP having the given ASN, the headend preferably uses a path-choosing metric to choose the appropriate LSP for the packet. One embodiment of the present invention stores path weights in the FEC table, where a path weight indicates the cost of taking the given next hop. Another embodiment of the present invention uses a tie-breaking mechanism, such as choosing the next hop with the lowest IP address, to choose between two potential LSPs. If the headend 210 does not have an entry in the FEC table for the AS associated with the source of the packet, one embodiment of the present invention ignores the data packet. Other embodiments of the present invention may perform different actions if there is no FEC table entry for the AS associated with the source of the packet.

Upon receiving the packet, the intermediate node 212 pops 516 the label off the packet and uses the popped label as an index into the "upstream label" column of its FEC table 400B. The intermediate node 212 then pushes 516 the downstream label from the corresponding table entry onto the packet. This process is referred to as "label swapping." In this example, the downstream label is "label_1." Next, the intermediate node 212 forwards the packet 518 to the "next hop" address in the corresponding table entry, which in this example is the address of tailend 214.

When the tailend 214 receives the packet, the tailend pops the label off the packet and uses the popped label as an index into the "upstream label" column of its FEC table 400A. Since the tailend 214 is the last node in the LSP, the tailend does not push another label onto the packet. Instead, the tailend 214 forwards 520 the unlabelled packet to the "next hop" address corresponding to the popped label. The next hop, by definition, is to the ISP associated with the end-user 110. Accordingly, IP data packets sent from the end-users 110 are delivered to the respective ISPs associated with the end-users. Since packets received by the ISP are unlabelled, the ISP treat the packet as a standard IP packet and can use destination-based forwarding or any other means that the ISP desires to deliver the packet to its final destination.

When a connection between routers is closed, or a router becomes inoperative, a LSP can be "torn down" by passing messages in the upstream direction. For example, if the border router forming tailend 216 loses its connection with the ISP 220 having ASN(Y), the border router 216 sends messages to its upstream nodes indicating that the label binding for ASN(Y) has become invalid. An upstream node, upon receiving the message, preferably deletes the corresponding entry from its FEC table. The upstream node then preferably passes the message to its upstream nodes using its upstream label bindings. In the end, the entire LSP is removed. As a result, traffic is dynamically rerouted around broken LSPs.

The present invention allows multiple ISPs 112 to be independently connected to the backbone 124 regardless of the network topology. In addition, each ISP 112 can peer with the backbone 124 at one or more different border routers 122. For example, an ISP 112 may wish to peer with the backbone 124 at multiple locations to provide redundancy and fault tolerance. When the border router 122 peering with the ISP 112 is activated, the border router 122 becomes the tailend of a LSP leading to the ISP. Since the headend of the LSP has knowledge of all of the LSPs available on the backbone 124, the headend can select the best path to reach a particular ISP. Traffic is dynamically rerouted in the case that a path fails due to, for example, a system failure or administrative activity.

It is desirable to account for the bandwidth on the customer access network 114 and backbone 124 utilized by each ISP 112. According to a preferred embodiment of the present invention, accounting is performed by monitoring the packets passing out of the backbone at each border router 122. Alternatively, if the border router 122 is only coupled to a single ISP 112, the packets flowing into the border router can be counted. The aggregation routers 116B and intermediate nodes 118 do not need to count packets, which makes internal routing more efficient.

This accounting allows ISPs 112 to enter into usage agreements with the entity managing the customer access network 114 and/or backbone 124. For example, a certain ISP can agree that its end-users will utilize up to a determined maximum amount of bandwidth. Alternatively, an ISP can agree to pay a fee based on the amount of bandwidth actually utilized by the end-users associated with that ISP. Under the present invention, the total downstream bandwidth available on the customer access network 114 and backbone 124 is utilized and shared efficiently, without any of the problems or inefficiencies inherent in alternative bandwidth-sharing solutions.

Another advantage of the present invention is that the source-based routing allows traffic policies to be enforced. In one embodiment of the present invention, the aggregation routers 116 can be configured to ignore or place a lower priority on IP packets received from end-users 110 associated with a particular ISP. For example, if an ISP has exceeded its bandwidth allocation, traffic from end-users of that ISP can be reduced or terminated by configuring the aggregation routers 116 to not forward packets from those end-users. Likewise, the traffic can be stopped at the border routers 122, although stopping the traffic at the aggregation routers 116 is preferred because the packets do not enter the backbone 124. Return traffic, from the ISP 112 to the end-user 110, can be handled independently of the technique described above.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. In a network having a headend and a tailend, a method of sharing bandwidth on the network among one or more internet service providers (ISPs) coupled to the tailend, the network receiving data packets from end-users coupled to the headend and associated with particular ones of the one or more ISPs, the method comprising the steps of:
    creating, at the tailend, a forwarding equivalency class (FEC) for each of the one or more ISPs coupled to the tailend;
    passing a label for each FEC towards the headend;
    storing a label for each FEC in an FEC table at the headend;
    receiving, at the headend, a data packet from an end-user;
    determining the ISP associated with the end-user; and
    routing the data packet through the tailend to only the ISP associated with the end-user using the label stored in the FEC table for the FEC of the ISP.

2. The method of claim 1, wherein the network comprises an intermediate node between the tailend and the headend and further comprising the steps of:
    receiving, at the intermediate node, the label and FEC from the tailend;
    building an intermediate FEC table at the intermediate node storing the label and the FEC received from the tailend;
    storing an upstream label for the FEC in the intermediate FEC table; and
    passing the upstream label and the FEC from the intermediate node to the headend.

3. The method of claim 1, wherein the determining step comprises the step of:
    determining an autonomous system number (ASN) of the ISP associated with the end-user.

4. The method of claim 3, wherein the routing step comprises the step of:
    looking up the ASN in the FEC table to determine the label.

5. The method of claim 1, wherein the step of storing the label for each FEC in the FEC table comprises the step of;
    verifying that a better path for the FEC does not exist.

6. The method of claim 5, wherein the step of storing the label for each FEC in the PEC table further comprises the steps of:
    arbitrating between similar FECs; and
    arbitrating between similar labels.

7. The method of claim 5, wherein the step of storing the label for each FEC in the FEC table further comprises the step of:
    selecting among multiple paths associated with an FEC using a path-choosing metric.

8. The method of claim 1, wherein the routing step comprises the step of:
    pushing the label stored in the FEC table for the FEC for the ISP onto the data packet.

9. The method of claim 1, further comprising the step of:
accounting for an amount of data passed to the ISP associated with the end-user.

10. The method of claim 9, wherein the accounting step comprises the step of:
accounting for an amount of data passing through the tailend to each of the one or more ISPs coupled to the tailend.

11. The method of claim 9, wherein the accounting step comprises the step of:
accounting for an amount of data received at the headend destined for each of the one or more ISPs coupled to the tailend.

\* \* \* \* \*

UNITED STATES PATENT AND TRADEMARK OFFICE
CERTIFICATE OF CORRECTION

PATENT NO. : 6,985,963 B1
DATED : January 10, 2006
INVENTOR(S) : Jeremy T. Johnson and Milo S. Median It is certified that error appears in the above-identified patent and that said Letters Patent is hereby corrected as shown below:

Column 10,
Line 55, delete "PEC" and insert -- FEC --.

Signed and Sealed this

Fourth Day of April, 2006

JON W. DUDAS
*Director of the United States Patent and Trademark Office*